(12) United States Patent
Tsao et al.

(10) Patent No.: US 6,782,212 B2
(45) Date of Patent: Aug. 24, 2004

(54) COHERENT OPTICAL COMMUNICATION RECEIVER OF SATELLITE OPTICAL COMMUNICATION SYSTEM

(75) Inventors: Shyh-Lin Tsao, Taoyuan (TW); Hao-Chih Yu, Yilan (TW); Yi-Chih Lin, Hsinchu (TW)

(73) Assignee: National Science Council, Taipei (TW)

( * ) Notice: Subject to any disclaimer, the term of this patent is extended or adjusted under 35 U.S.C. 154(b) by 568 days.

(21) Appl. No.: 09/783,461

(22) Filed: Feb. 14, 2001

(65) Prior Publication Data

US 2002/0167708 A1 Nov. 14, 2002

(51) Int. Cl.$^7$ .............................................. H04B 10/06
(52) U.S. Cl. ...................... 398/205; 398/204; 398/115; 398/116
(58) Field of Search ................................. 398/204, 121, 398/115, 116, 203, 208, 209, 135, 119, 205; 370/326, 202, 281; 455/110, 67.11, 118; 250/341.3, 225

(56) References Cited

U.S. PATENT DOCUMENTS

| | | | | |
|---|---|---|---|---|
| 4,949,056 A | * | 8/1990 | Akkapeddi | 359/334 |
| 4,989,200 A | * | 1/1991 | Olshansky et al. | 398/76 |
| 5,134,509 A | * | 7/1992 | Olshansky et al. | 398/76 |
| 5,144,468 A | * | 9/1992 | Weverka | 398/188 |
| 5,321,849 A | * | 6/1994 | Lemson | 455/67.11 |
| 5,457,811 A | * | 10/1995 | Lemson | 455/67.11 |
| 5,652,750 A | * | 7/1997 | Dent et al. | 370/326 |
| 5,678,198 A | * | 10/1997 | Lemson | 455/67.11 |
| 6,108,113 A | * | 8/2000 | Fee | 398/16 |
| 6,490,066 B1 | * | 12/2002 | Korevaar | 398/128 |

* cited by examiner

*Primary Examiner*—Jason Chan
*Assistant Examiner*—David Payne
(74) *Attorney, Agent, or Firm*—J.C. Patents

(57) ABSTRACT

A coherent optical communication receiver of a satellite optical communication system, having a telescope, an automatic frequency control circuit and a frequency shift keying demodulator. The automatic frequency control circuit has a local oscillating laser, a light polarization controller, a optical coupler, a photo-detector, a microwave matching network, a microwave mixer, a frequency discriminator and a low pass frequency filter. The coherent optical communication receiver can receive a frequency control signal of a distant laser signal to perform a heterodyne receiving between the emitter and the receiver distant away from each other. With the consideration of the decay of vibration and atmosphere, the quality of the satellite optical communication can still be maintained. The structure and fabrication of the receiver are simple with a low fabrication cost, and the receiver is suitable for being applied to high speed satellite communication system.

11 Claims, 6 Drawing Sheets

Laser Phase Noise $\Delta \nu = 10$ Mbps
$\tau = 9$
Data Speed $\Delta f = 2.5$ Gbps
Divergent Angle of Light Beam
$\theta_r = 5.5 \times 10^{-7}$
Standard Deviation of Vibration Angle
$\sigma_{vr} = 0.001$
$\alpha = 3$
FSK Hudulation Frequency Shift
$\Delta w = 2.5$ GHz
$P_T = 100$mW

COHERENT OPTICAL COMMUNICATION RECEIVER OF SATELLITE OPTICAL COMMUNICATION SYSTEM

BACKGROUND OF THE INVENTION

1. Field of the Invention

The invention relates to a coherent optical communication receiver of an optical satellite communication system with two-laser optical transmitter. More particularly, this invention relates to a coherent optical communication receiver which can extract a microwave reference signal for tracking the laser's frequencies coming from a two laser optical satellite transmitter.

2. Description of the Related Art

The data rate of the current microwave communication system is about several hundred Mbit/s. It cannot meet the demand of highly increased data amount in the future. In optical fiber communication system, the data rate has reached 40 Gbit/s. The transmission bandwidth is larger than that of the conventional microwave satellite communication system. In the future, to obtain a global high speed communication backbone network by linking the satellite communication and the optical fiber communication, the bandwidth of the current satellite communication system has to be extended. Thus, while adopting the optical communication technique in satellite communication, the problem of having insufficient bandwidth of the satellite microwave communication has to be resolved.

The optical frequency of a laser is easily affected by temperature, sometimes the frequency drifting of a laser occurs. When a light signal is emitted from the optical transmitter to the receiver, some impacts including the influence of weather, laser light beam and satellite vibration should be considered. Thus demodulating the light signal received by an optical receiver, for a conventional coherent optical communication system, the light carrier tracking ability is strongly affected by the light frequency drifting from the optical transmitter. In addition, the conventional satellite communication system, the satellite requires a power source (solar energy) to provide electric power to the microwave emitter and receiver. For the optical satellite communication system applying in two-laser light emitting, only a mirror is required. Of course, the signal can be covered by the receiver disclosed in this invention.

SUMMARY OF THE INVENTION

The invention provides a coherent optical communication receiver for a two laser emitting satellite coherent optical communication system. The coherent optical communication receiver can overcome the influence of weather, temperature, light beam spreading of the transmitter laser and satellite vibration with correctly tracking the signal.

The coherent optical communication receiver of the satellite communication system provided in the invention comprises a telescope, an automatic frequency control circuit, and a frequency shift keying demodulator. The telescope collect the light signal emitted from the satellite transmitter station. The automatic frequency control circuit is followed the telescope with an optical fiber to receive the optical signal transmitted from the telescope, and then the two optical light signal coming from the transmitter mixing with the light signal provided in the receiver end as output. The frequency shift keying demodulator is electrically connected to the automatic frequency control circuit to receive the mixed signal, for demodulating the data. The optical signal transmitted from the transmitter includes a modulated signal laser light with a local reference laser frequency signal for automatic frequency control. The photodetector in the automatic frequency control circuit can mix the modulated signal laser light frequency and the local oscillator light frequency coming from the transmitter and the local oscillator light frequency given by the receiver end to be a mixed microwave signal that comprises a microwave reference signal and a demodulated signal on demand. The automatic frequency control circuit uses microwave reference signal mixing in a microwave mixer for tracking the demodulated signal. With a frequency shift keying demodulator, the received demodulated signal is correctly demodulated to output a data.

In the automatic frequency control circuit, a local oscillating laser is used to enhance the system sensitivity. A light polarization controller is used to control the laser light polarization of the local oscillating laser to an optimal polarization status. A 1×2 optical fiber coupler is used to connect the telescope and the local oscillating laser to the photodetector. The beat frequencies of the received light carriers locate at microwave band. A microwave broadband matching network circuit is electrically connected to the photo-detector for impedance matching of the microwave signals. A microwave mixer is electrically connected to the microwave matching network for mixing the the two microowave beat signals. The intermediate frequencies including the frequency shift keying (FSK) signals are fed to the frequency shift keying demodulator for receiving the baseband data. A frequency discriminator is electrically connected to the microwave mixer to discriminate the mixed intermediate frequency signal and output a discriminating signal. A low pass frequency filter is electrically connected to the frequency discriminator and the error signal feedback to the local oscillating laser for tracking the two laser' frequencies.

In the invention, a frequency tracking signal generated from the distant dual frequency lasers is output from the optical transmitter, so that a heterodyne receiving can be performed between the very distant transmitter and receiver. Even with the consideration of the influence of satellite vibration and the attenuation through atmosphere, the quality of the satellite optical communication can be maintained. As the structure and fabrication of the receiver are simple, the fabrication cost can be reduced. This receiver is suitable for applying in a high speed satellite communication system. In addition, only put a mirror and a vibration control circuit on a satellite, no transponder is required on the satellite. Comparing with the microwave satellite system, the power consumption is thus reduced. The system is not affected by the sunspot and can provide multiple light beam superposition. Being reflected by a mirror, the multiple access can be achieved.

Both the foregoing general description and the following detailed description are exemplary and explanatory only and are not restrictive of the invention, as claimed.

DESCRIPTION OF THE PREFERRED EMBODIMENTS

Figure 1:
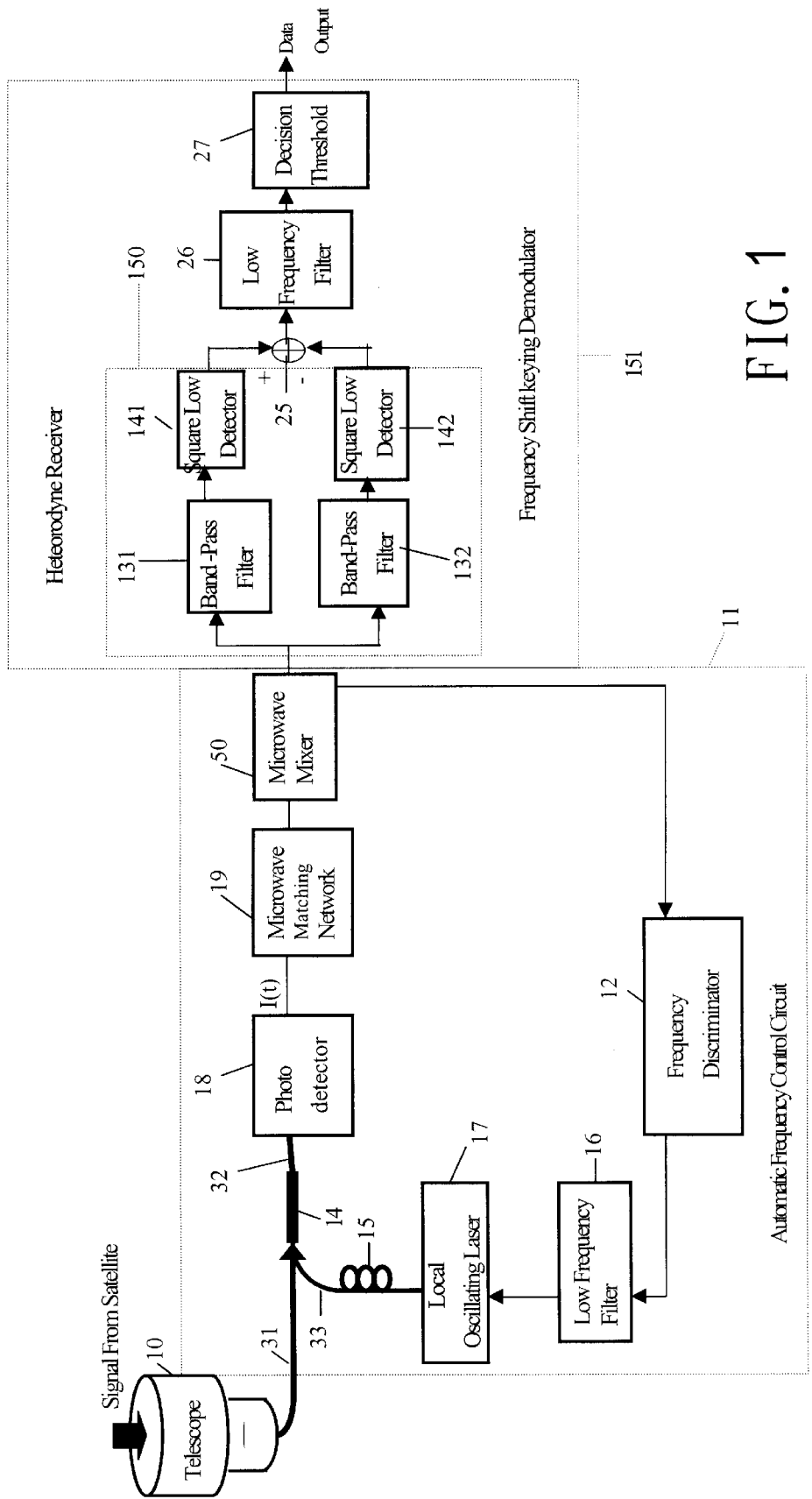
FIG. 1 is a layout of a coherent optical communication receiver provided by the invention.

FIG. 1 shows a schematic diagram of a coherent optical communication receiver provided by the invention. The receiver comprises a telescope 10, an automatic frequency control circuit 11 and a frequency shift keying (FSK) modulator 151. The automatic frequency control circuit 11 further comprises a optical coupler 14, a light polarization controller 15, a low pass frequency filter 16, a local oscillating laser 17, a photo-detector 18, a microwave matching network 19, a microwave mixer 50 and a frequency discriminator 12. The frequency shift keying modulator 151 further comprises a heterodyne receiver 150 which includes two band-pass filter 131, 132 and two square law detectors 141, 142, an adder 25, a low pass frequency filter 26 and a decision threshold 27.

Figure 2:
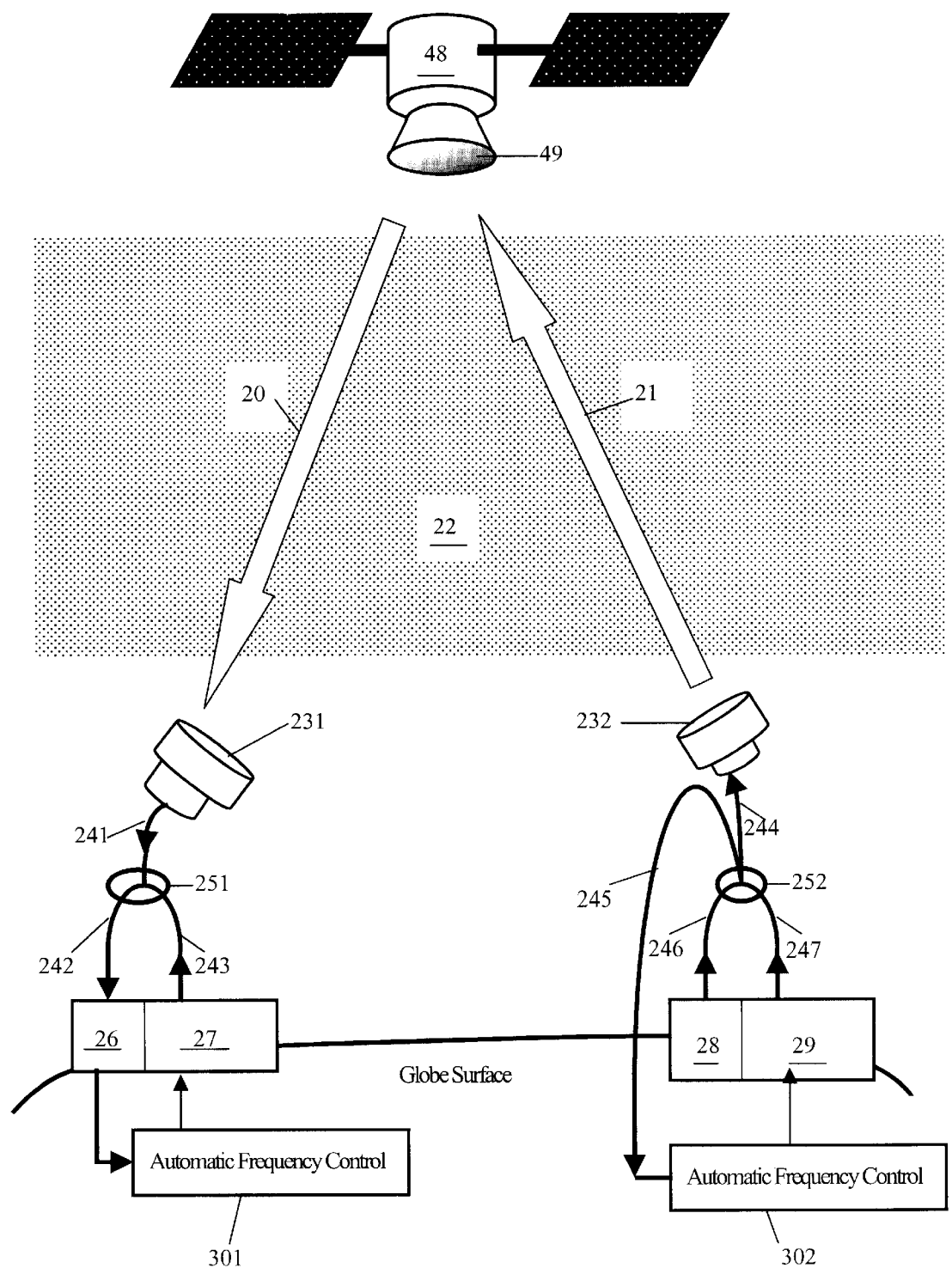
FIG. 2 shows a structure of a satellite optical communication system.

The telescope 10 receives an optical signal (including a modulated signal laser optical frequency and a microwave reference frequency) reflected from a satellite (as shown in FIG. 2). Using an optical fiber 31, the automatic frequency control circuit 11 is connected to the telescope 10 to receive the optical signal and convert the optical signal into a mixing signal to be output. The frequency shift keying demodulator 151 and the automatic frequency control (AFC) circuit 11 are electrically connected. The frequency shift keying demodulator 151 thus receives the mixing signal and then outputs a data.

The local oscillating laser 17 generates a laser light frequency. The light polarization controller 15 controls the laser light frequency generated by the local oscillating laser 17 to an optimum polarization. Using optical fibers 31 and 33, the optical coupler 14 is connected to the telescope 10 and the local oscillating laser 17. The photodetector 18 is used to receive the modulated signal of laser, the local oscillator laser frequency coming from the transmitter and the local oscillator laser light frequency from the optical coupler 14 to generate microwave reference frequency and record the modulated signal. The microwave matching network 19 is connected to the photo-detector 18 for impedance matching of the microwave signal. The microwave mixer 50 is electrically connected to the microwave matching network 19 and generate a mixing signal output to the frequency shift keying demodulator 151. The frequency discriminator 12 is electrically connected to the microwave mixer 50 to generate an error signal used for tracking the modulated signal. The low pass frequency filter 16 is electrically connected to the frequency discriminator 12 and the local oscillating laser 17. The discriminating signal output from the frequency discriminator 12 is thus received and filtered to generate a low pass frequency signal by the low pass frequency filter 16. The low pass frequency signal is then output to the local oscillating laser 17.

The optical coupler 14 includes a 2×1 optical coupler. The microwave mixer 50 includes a single side mixer or a balanced mixer. The frequency shift keying demodulator 151 includes a heterodyne receiver 150 electrically connected to the automatic frequency control circuit 11. An electrical signal output by the automatic frequency control signal 11 is received 150 and a plurality of modulating signals are output by the heterodyne receiver. The adder 25 sums up the modulating signals to obtain a total demodulating signal. After receiving the total demodulating signal, the low pass frequency filter 26 output low frequency signal. The decision threshold 27 is electrically connected to the low pass frequency filter 26 to receive the low frequency signal output from the low pass frequency filter 26 and to output a data.

In addition, the band-pass filter 131 and included in the heterodyne receiver 150 is electrically connected to the automatic frequency control circuit 11 to receive the mixing signal output by the automatic frequency control circuit 11. Being filtered, an intermediate frequency signal is output by the band-pass filter 131. The square law detector 141 is electrically connected to the band-pass filter 131 to receive the intermediate frequency signal and to generate a modulated signal to be output to the adder 25. The band-pass filter 132 is electrically connected to the automatic frequency control circuit 11 to receive the mixing signal. The square law detector 142 is electrically connected to the band-pass filter 132 to receive the intermediate frequency signal output by the band-pass filter 132 and to generate and output a demodulated signal to the adder 25.

The signal emitted from the satellite is received by the telescope 10 and converted into an electric signal I(t) by the photo-detector 18. To obtain a microwave reference signal in I(t), the local oscillating laser 17 is used at the receiving terminal, and a heterodyne receiving method is applied to amplify the emitted signal and the microwave reference signal. In addition, a microwave mixer 50 and a microwave matching network are used to extract the amplified microwave reference signal.

To tracking the frequency of the laser light output from the transmitter, the automatic frequency control circuit 11 in the receiving terminal can track the beat note, that is, the microwave reference signal which is the beat frequency of the two-laser light emitted from the transmitter. The frequency shift keying demodulator 151 can perform a correct demodulation on the received FSK signal. Since the microwave reference signal has been stabilized in the emitting terminal, so that the additional microwave reference oscillator is not required. Thus, not only the system structure can be simplified, but also the signal noise accompanied with the microwave reference oscillator can be eliminated.

FIG. 2 shows the structure of the satellite optical communication system. In FIG. 2, the satellite communication system comprises a signal emitter, a satellite 48, and a receiver. The signal emitter comprises a laser 28, an emitting terminal local oscillating laser 29, optical fibers 244, 245, 246 and 247, an optical fiber coupler 252, an automatic frequency control circuit 302 and a telescope 232. The satellite 48 includes a surface aperture and a mirror 49 of about 1 meter. The receiver includes a telescope 231, optical fibers 241, 242, 243, an optical fiber coupler 251, an optical signal receiver 26, a receiving terminal local oscillating laser 27, and an automatic frequency control circuit 301.

The light transmitter 28 emits a modulated signal via the optical fiber coupler 252 and a local oscillating signal via the emitting terminal local oscillating laser 29. The signals are emitted from the transmitting terminal to the satellite 48, and then reflected by a mirror to the telescope 231 at the receiving terminal for transmitting the frequency control signal. Since the laser is easily affected by the temperature, so that the generated optical frequency is not stable. To resolve this problem, the emitting terminal local oscillating laser 29, the laser light emitter 28, and the automatic frequency control circuit 302 are used to generate a stable microwave reference signal. The receiving terminal of the optical communication receiver can thus correctly demodulate the microwave reference signal.

The signal traveling through the optical signal path 21 and the reflection optical signal path 20 are affected by the weather and the vibration of the satellite. With considering the divergence of the laser beam, the signal will be degraded because of beam divergency. Therefore, a heterodyne receiver is used at the receiving terminal to enhance the receiving sensitivity. The automatic frequency control circuit 301 can be used to track the modulated signal to improve the precision of demodulation.

Figure 3:
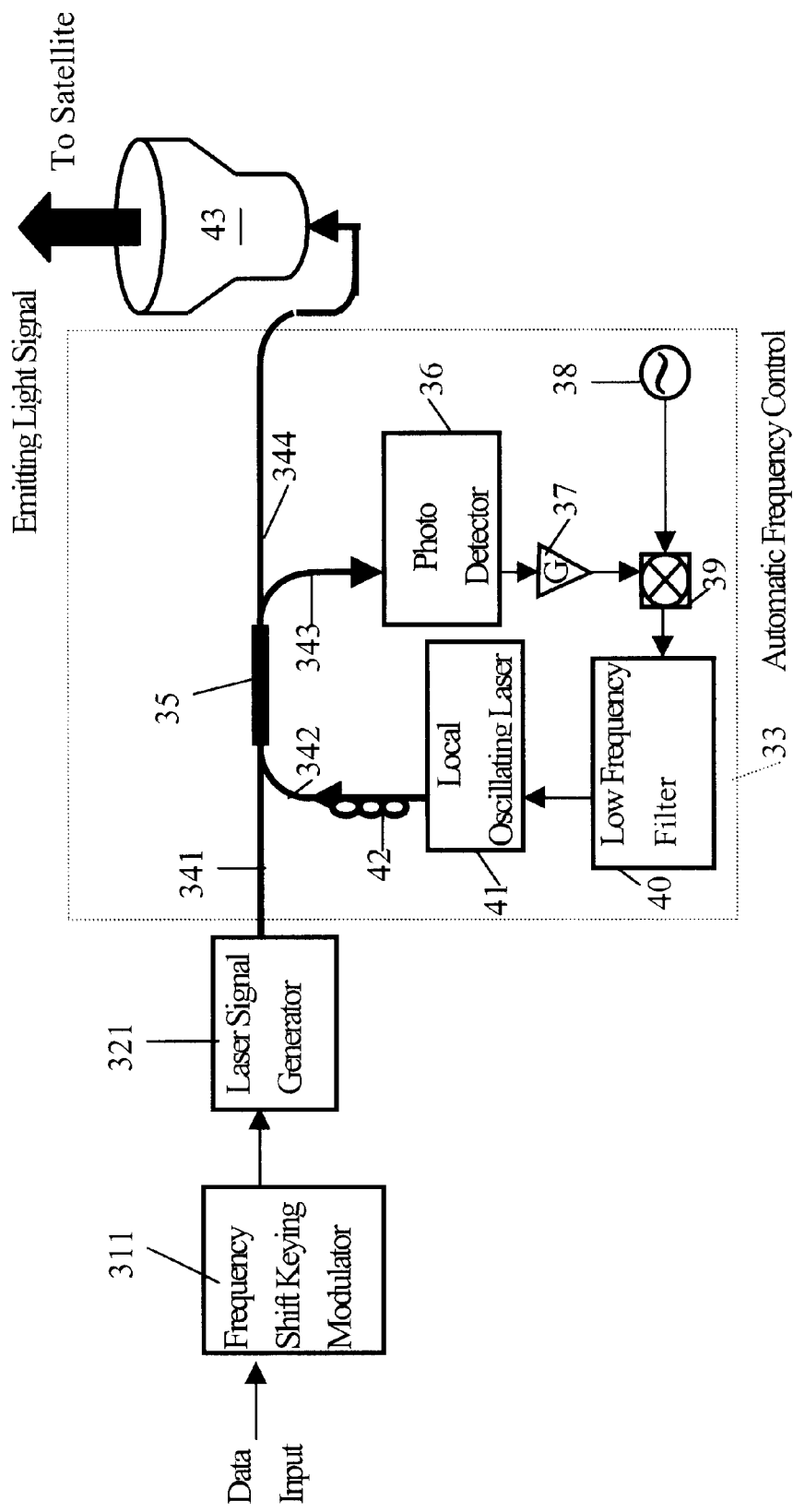
FIG. 3 is a layout of a coherent optical communication transmitter.

FIG. 3 shows the structure of the coherent light transmitter. Similar to the Taiwanese patent application (88114869), the transmitter comprises a frequency shift keying demodulator 311, a laser signal generator 321, optical fibers 341, 342, 343, 344, an automatic frequency control circuit 33 and a telescope 43. The automatic frequency control circuit 33 further comprises a 2×2 optical coupler 35, a light polarization controller 42, a photo-detector 36, a signal amplifier 37, a reference voltage signal generator 38, a signal mixer 39, a low pass frequency filter 40 and a local oscillating laser 41.

A light signal is emitted from the laser signal generator 321 to enter the optical fiber path 341, and then coupled with the light signal generated by oscillating laser 41 in the optical coupler 14. Through the feedback control circuit including the fiber 343, the photodetector 36, the amplifier, the mixer 39, the low pass filter 40, the local oscillator laser 41, the polarization controller 42, the fiber 342 and the optical coupler 35, the frequency difference between the laser light frequency of the demodulated laser and the emitting terminal local oscillating laser 41 can be fixed. A microwave reference signal (the beat note) is transmitted through the two-laser light emitting. The applicability of the invention is further described with the accompany the following mathematical model.

In the emitter, the signal to be transmitted is $S(t)$ and the signal of the emitting terminal local oscillating laser 41 is $L_T(t)$:

$$S(t) = \sqrt{P_S} \cos(\omega_i t + \phi_s(t))$$

$$\omega_i = \begin{cases} \omega_1 = \omega_s + \Delta\omega \Rightarrow m(t) = 1 \\ \omega_2 = \omega_s - \Delta\omega \Rightarrow m(t) = 0 \end{cases}$$

$$L_T(t) = \sqrt{P_T} \cos(\omega_T t + \phi_{T_s}(t))$$

wherein $P_S$ and $P_T$ are the powers of the frequency shift keying demodulator 31 and the emitting terminal local oscillating laser 321, respectively. $\phi_S(t)$ and $\phi_T(t)$ are the phase noises of these two lasers, respectively. $\omega_S$ is the carrier wave frequency of the demodulated signal, and $\omega_T$ is the optical frequency of the local oscillating laser 41. $m(t)$ is the base frequency signal, and $\Delta\omega$ is the modulating frequency offset of the frequency shift key demodulator 33. Using the automatic frequency control circuit 33 to fix the light frequency difference $\Delta\omega_1$ between $\omega_S$ and $\omega_T$ constant, a microwave reference signal can be generated in the receiver of which the frequency is $\Delta\omega_1$.

When the light signal is emitted from the emitting terminal, experiencing light beam divergence and light absorption and scattering of micro-particles of the atmosphere, the signal power from the emitting terminal to the receiving terminal is attenuated as:

$$P_{unscatter} = P_{source} \exp(-\tau)$$

$$\tau = L_C/L_E$$

wherein $\tau$ represents the weather attenuation variable and $P_{unscatter}$ and $P_{source}$ represent the received attenuated signal and the signal source, respectively. $L_C$ and $L_E$ are the cloud average thickness and the attenuation path length, respectively.

The signal power is also affected by the satellite vibration to resulting in an intensity attenuation. The attenuation amount is represented by $L_{loss}(\theta_r)$.

$$L_{loss}(\theta_r) = \exp(-\theta_r^2)$$

wherein $\theta_r$ is the angle of the satellite vibration. The probability distribution of the angle of the satellite vibration is:

$$f(\theta_r) = \frac{\theta_r}{\sigma_{vr}^2} \exp\left[-\left(\frac{\theta_r}{\sqrt{2\sigma_{vr}}}\right)^2\right]$$

wherein $\sigma_{vr}$ is the standard deviation of the satellite vibration.

Concluding the above attenuation, the signal received at the receiving terminal can be represented as:

$$S_{reflect}(t) = \sqrt{P_S R_{loss} L_{loss}(\theta_r)} \exp(-\tau) \cos(\omega_S t + \phi_S(t))$$

$$L_{reflect}(t) = \sqrt{P_T R_{loss} L_{loss}(\theta_r)} \exp(-\tau) \cos(\omega_T t + \phi_T(t))$$

wherein $R_{loss}$ is the attenuation of signal due to attenuation of the divergent angle of the light beam and $$R_{loss} = \left[\frac{\overline{D_r}}{2\left(\overline{D_t} + \sqrt{2\overline{L_{E-S}}^2}(1 - 2\cos(\theta_1))\right)}\right]^2$$

wherein $\overline{D_r}$ is the aperture of the lens of the telescope 231, $\overline{D_T}$ is the aperture of the lens of the telescope 232, $\overline{L_{E-S}}$ is the distance between the emitter and the satellite, and $\theta_1$ is the divergent angle of the light beam.

When the signal is transmitted from the emitting terminal to the receiving terminal, the received signal is attenuated due to the aforementioned factors. Therefore, a heterodyne receiving method is used to enhance the sensitivity of the system. Assuming that the local oscillating laser 17 (referring to FIG. 1) is $L_R(t)$:

$$L_R(t) = \sqrt{P_R} \cos(\Omega_R t + \phi_R(t))$$

wherein $P_R$ represents the emission power of the local oscillating laser 17 at the receiving terminal (referring to FIG. 1), $\omega_R$ is the frequency of the local oscillating laser 17, and $\phi_R(t)$ is the phase noise of the local oscillating laser 17. The optical signal is converted into an electrical signal via the photo-detector 18 as:

$$I(t) = R\{\sqrt{P_S P_T R_{loss} L(\theta_T)} (\exp(-\tau))^2 \cos[(\Delta\omega_1 \pm \Delta\omega)t + (\phi_S(t) - \phi_R(t))] +$$
$$2\sqrt{P_S P_T R_{loss} L(\theta_T)} \exp(-\tau)\cos[(\Delta\omega_{1F} \pm \Delta\omega)t + (\phi_S(t) - \phi_R(t))] +$$
$$2\sqrt{P_S P_T R_{loss} L(\theta_T)} \exp(-\tau\cos[(\Delta\omega_2 \pm \Delta\omega)t + (\phi_T(t) - \phi_R(t))]\}$$

wherein R is the optical responsivity of the photo-detector 18. $\omega_{1F}$ is the frequency difference between the signal and the local oscillating laser 17 at the receiving terminal. $\Delta\omega_2$ is the frequency difference between the local oscillating lasers 41 and 17 at the emitting and receiving terminals. $\Delta\omega_1$ is the frequency difference between the light emitting laser 28 and the local oscillating laser 17 at the emitting terminal and the receiving terminal.

Figure 4:
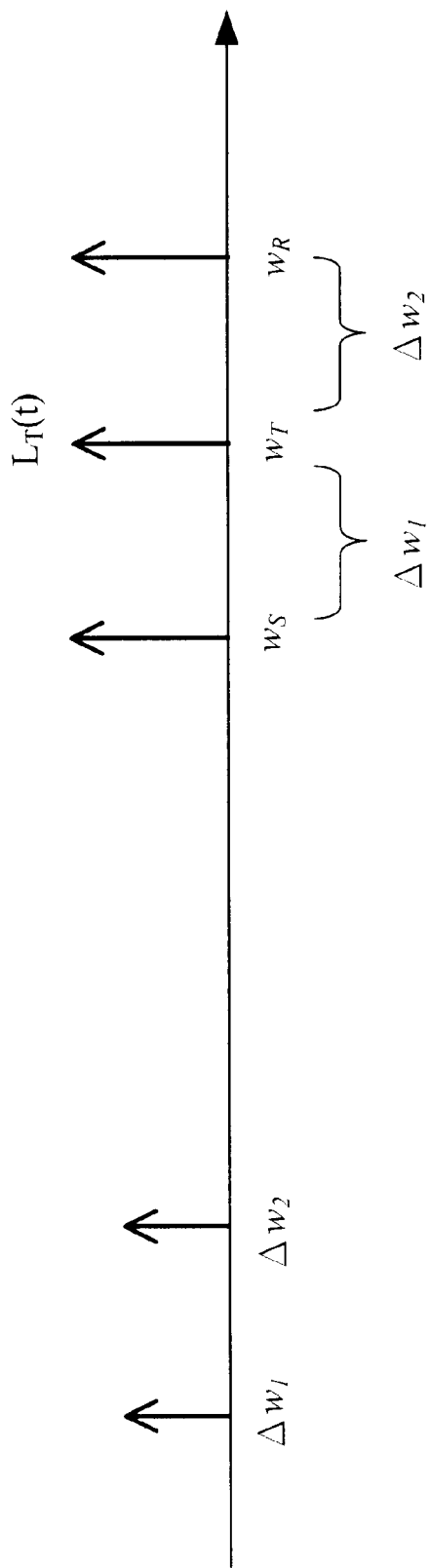
FIG. 4 shows a spectrum received by the photo-detector of the coherent optical communication system.

FIG. 4 shows the spectrum received by the photo-detector in the coherent optical communication system. From the spectrum received by the photo-detector 18, the frequency difference $\Delta\omega_1$ between the signal frequency $\omega_S$ and the frequency $\omega_T$ of the local oscillating laser 41 at the emitting terminal is fixed by the automatic frequency control circuit 33 at the emitting terminal. A microwave reference signal is then generated and transmitted from the emitting terminal to the receiving terminal. Being controlled by the automatic frequency control circuit 11, the frequency differences $\Delta\omega_2$ can be feedback controlled with using the beat note $\Delta\omega$ as a microwave reference signal.

In the invention, the microwave reference signal has to be large enough to perform frequency control and demodulation. The signal-to-noise (S/N) ratio can be expresses as:

$$CNR_R = \int_0^\infty CNRR(\theta_R) f(\theta_r) d\theta$$

After simplifying the above equation:

$$CNRR(\theta_r) \approx \frac{\frac{1}{2}\{4R^2\sqrt{P_S^2 P_T P_R R_{loss}^3 L_{loss}^3} [\exp(-\tau)^3]\}^2}{I(\theta_r)^2 [\sigma_S^2(\theta_R) + \sigma_T^2]}$$

wherein $$I(\theta_r) = 2R\sqrt{P_S P_R R_{loss} L_{loss}(\theta_t)} \exp(-\tau) +$$
$$2R\sqrt{P_S P_T R_{loss} L_{loss}(\theta_r)}[\exp(\tau)]^2$$

$\sigma_S$ and $\sigma_T$ represent the shot noise and the thermal noise respectively as:

$$\sigma_S^2 = 2q(I(t) + I_d)\Delta f$$
$$\sigma_T^2 = (4kT_{emp}/R_L)A_n\Delta f$$

wherein q, k, $T_{temp}$ and $R_L$ are the electron charge, Boltzman constant, temperature and load resistance. $I_d$, $A_n$ and $\Delta f$ are the dark current, the amplifier noise and the filter bandwidth.

After controlling the demodulated signal, using two band-pass filters 131, 132, the demodulated signal is filter. After the post treatment, for example, through the square law detectors 141, 142, the adder 15 and the decision threshold 16, the signal is obtained. The time response of the band-pass filters 131, 132 and a low pass frequency filter 16 can be designed as:

The time response of the band-pass filter 131 is:

$$BPF_1(t) = \begin{cases} \frac{\alpha}{T}\cos[(\omega_{IF} + \Delta\omega)t] & \text{if } t \in \left[0, \frac{T}{\alpha}\right] \\ 0 & \text{if } t \notin \left[0, \frac{T}{\alpha}\right] \end{cases}$$

The time response of the band-pass filter 132 is:

$$BPF_2(t) = \begin{cases} \frac{\alpha}{T}\cos[(\omega_{IF} + \Delta\omega)t] & \text{if } t \in \left[0, \frac{T}{\alpha}\right] \\ 0 & \text{if } t \notin \left[0, \frac{T}{\alpha}\right] \end{cases}$$

and the time response of the low pass frequency filter 16 is:

$$H_L(t) = \sum_{i=1}^{\alpha} \delta\left(t - \frac{iT}{\alpha}\right)$$

wherein T and $\alpha$ are the periods of the demodulated signals and are positive integers larger than 1.

After the operations of the above three filters, samplings of the demodulated signals are obtained to derive a bit error rate (BER) equation to represent the performance of the system:

$$\gamma(\theta_r) = \frac{\sqrt{2\alpha}\left[\frac{1}{2} - \frac{\pi\Delta\nu T}{6\alpha} - \frac{\alpha(\alpha + \pi\Delta\nu T - \alpha\cos(2\Delta\omega T/\alpha))}{(2\Delta\omega T)^2}\right]}{\left[\frac{2}{45}\left(\pi\Delta\nu\frac{T}{\alpha}\right)^2 \varsigma(2\Delta\omega T) + \frac{\alpha^2}{\psi(\theta_r)^2} + \frac{2\alpha}{\psi(\theta_r)}\right]}$$
$$\left[\frac{1}{2} - \frac{\pi\Delta\nu T}{6\alpha} - \frac{\alpha(\alpha + \pi\Delta\nu T - \alpha\cos(2\Delta\omega T/\alpha))}{(2\Delta\omega T)^2}\right]^{1/2}$$

wherein $\Delta\nu$ is sum of the phase noises of the signal S(t) and the local oscillating laser signal $L_T(t)$, and $$\Delta\nu = \Delta\nu_S + \Delta\nu_L$$

$\Delta\nu_S$ and $\Delta\nu_L$ are the phase noises of the signal S(t) and the local oscillating laser signal $$\varsigma(2\Delta\omega T) = \begin{cases} 1 - e^{-\beta\rho\Delta\omega T}\left[\cos(q) + \frac{\beta}{\sqrt{1-\beta^2}}\sin(q)\right] & \text{for } \beta \neq 1 \\ 1 - e^{-\beta\rho\Delta\omega T} - \rho 2\Delta\omega T e^{-\rho 2\Delta\omega T} & \text{for } \beta = 1 \end{cases}$$

$$\rho \approx -0.0155 - \frac{0.263}{\alpha^2} + \frac{0.578}{\alpha}$$

$$\beta \approx 0.27 - \frac{1.5}{\alpha^2} + \frac{2.22}{\alpha}$$

$$q = \rho 2\Delta\omega T\sqrt{1-\beta^2}$$

$$SNR_S(\theta_r) \approx \frac{\frac{1}{2}\left[4R^2\sqrt{P_S P_T P_R^2 R_{atio}^3}(\exp(-\theta_\nu))^2\right]^2}{I(\theta_\nu)^2[\sigma_S^2(\theta_R) + \sigma_T^2]}$$

To further reduce the bit error rate to a minimum, the system can be set with a condition that meets $\Delta\nu T/\alpha \leq 1 \leq \Delta\omega T/\alpha$.

Substituting the above equation, the bit error rate of the system in the embodiment can be obtained as:

$$BER(\theta_r) \equiv Q(\gamma(\theta_r)) = \frac{1}{\sqrt{2\pi}} \int_{\eta\gamma(\theta_r)}^{\infty} e^{-x^2/2} dx$$

Considering the satellite vibration effect, $$BER = \int_0^\infty BER(\theta_r) f(\theta_r) d\theta_r$$

In the above equation, η is an empirical value of about 1.36.

Figure 5:
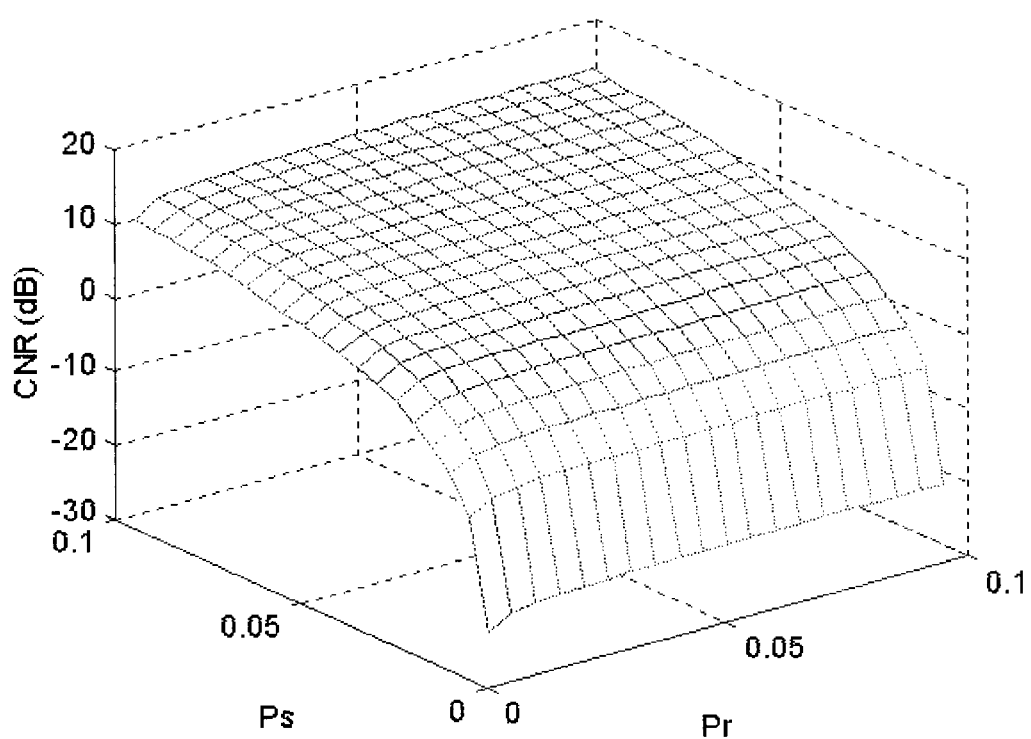
FIG. 5 shows a relationship between a signal-to-noise ratio of a microwave reference signal corresponding to the power of the modulated signal and the power of the local oscillating laser at the receiver.

In this embodiment, receiving a 2.5 Gbps digital signal is used as an example to calculate the signal-to-noise ratio and the bit error rate for evaluating the system performance. FIG. 5 shows the relationship between the signal-to-noise ratio of the microwave reference signal and the power of the demodulated signal and the power of the local oscillating laser at the receiving terminal. Other parameters are all defined at the Table 1 of the tables of a coherent optical communication system. In Table 1, the signal-to-noise increases with the powers $P_S$ and $P_R$. If the power $P_S$ reaches the maximum value of the 20 dBm range, and the range of the power $P_R$ is between 10–20 dBm, the signal-to-noise can reaches a value more than 10 dB. If the power $P_S$ is ranged at a minimum of 17 dBm, and the power $P_R$ varies between the range of 10–20 dBm, the signal-to-noise ratio of the microwave signal can still reach 10 dB. From this analysis, it is proved that to have the microwave reference signal, the system can effectively transmit a signal

TABLE 1

| Parameters | Symbol | Magnitude |
| --- | --- | --- |
| Distance from the satellite to the Earth | z | 35000 km |
| Reaction constant of the photo-detector | R | 0.7 |
| Boltzman Constant | k | $1.38 \times 10^{-23}$ |
| Temperature | $T_{temp}$ | 300 K |
| Impedance of the receiver | $R_L$ | 50 Ω |
| Noise of the amplifier | $A_n$ | 1 dB |
| Dark current | $I_d$ | $10^{-6}$ A |
| Data speed | Δf | 2.5 Gbps |
| Light beam divergent angle | $\theta_t$ | $10^{-6o}$ |
| Attenuation constant of weather factor | τ | 3 |
| Standard deviation of the satellite vibration angle | $\sigma_{vr}$ | 0.0001 |
| IF filter parameter | α | 4 |
| Aperture of the telescope at the emitting terminal | $D_t$ | 1 cm |
| Aperture of the telescope at the receiving terminal | $D_r$ | 1 m |

Figure 6:
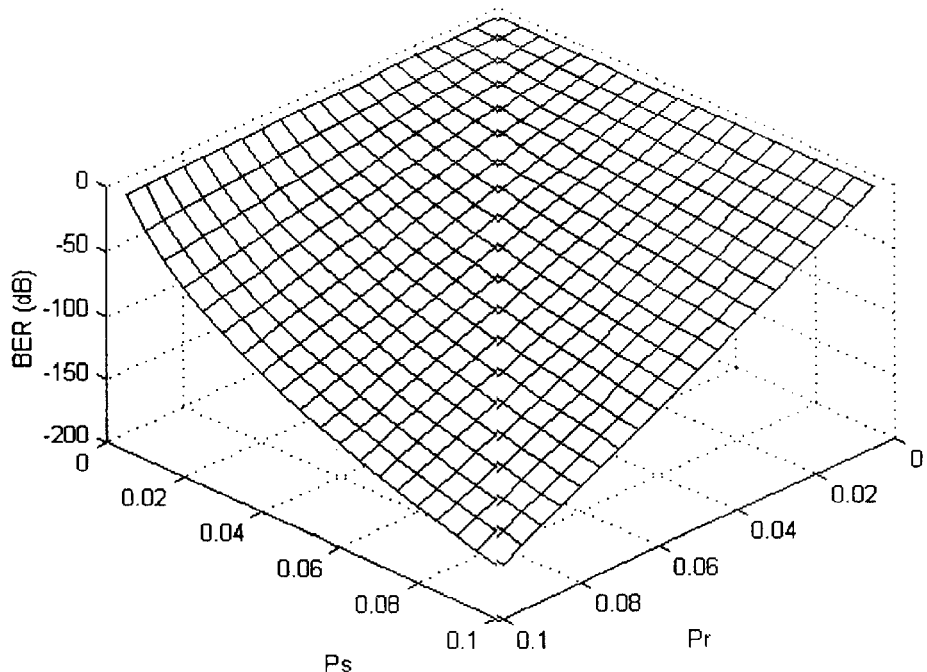
FIG. 6 shows a relationship of error coding coefficient corresponding to the power of the modulated signal power and the power of the local oscillating laser at the receiver when there is a phase noise.

FIG. 6 shows a relationship of the bit error rate corresponding to the powers of demodulated signal and the local oscillating laser at the receiving terminal when a phase noise exists. The parameters are defined in Table 2 of parameters of coherent optical communication system. From the analysis of FIG. 6, the bit error rate decreases as the powers $P_S$ and $P_R$ increase. According to an investigation, when $P_S$ reaches a magnitude more than 20 dBm, and $P_R$ is between 17.5 dBm and 20 dBm, the bit error rate can be less than $10^{-9}$.

TABLE 2

| Parameters | Symbol | Magnitude |
| --- | --- | --- |
| Distance from the satellite to the Earth | z | 35000 km |
| Reaction constant of the photo-detector | R | 0.7 |
| Boltzman Constant | k | $1.38 \times 10^{-23}$ |
| Temperature | $T_{temp}$ | 300 K |
| Impedance of the receiver | $R_L$ | 50 Ω |
| Noise of the amplifier | $A_n$ | 1 dB |
| Dark current | $I_d$ | $10^{-6}$ A |

TABLE 2-continued

| Parameters | Symbol | Magnitude |
| --- | --- | --- |
| Data speed | Δf | 2.5 Gbps |
| Light beam divergent angle | $\theta_t$ | $10^{-6o}$ |
| Attenuation constant of weather factor | τ | 8 |
| Standard deviation of the satellite vibration angle | $\sigma_{vr}$ | 0.0001 |
| IF filter parameter | α | 1 |
| FSK demodulation frequency shift | Δω | 2.5 GHz |
| Phase Noise | υ | 10 MHz |
| Aperture of the telescope at the emitting terminal | $D_t$ | 1 m |
| Aperture of the telescope at the receiving terminal | $D_r$ | 1 m |
| Laser phase noise | Δυ | 10 MHz |

| Type of Cloud | Average Altitude (×1000 ft) | Layer | Extinction Length (m) | Average Thickness (ext. Lengths) |
| --- | --- | --- | --- | --- |
| Cumulonimbus | 2.5–18 | Middle | 25 | 120 |
| Nimbootratus | 6.5–10 | Middle | 55 | 51 |
| Altocumulus | 15–20 | Middle | 65 | 18 |
| Altostratus | 14–22 | Middle | 45 | 30 |
| Stratocumulus | 2.5–3.0 | Low | 20 | 27 |
| Stratus | 2–5 | Low | 15 | 62 |
| Cumulus | 2–5 | Low | 50 | 10 |
| Cirrosfratus | 30–35 | High | 350 | 5 |
| Cirrocumulus | 22–26 | High | 350 | 5 |
| Cirrus | 20–30 | High | 350 | 3 |

In the analysis of the relationship between the signal-to-noise ratio of the microwave reference signal and the signal power and the local oscillating laser power at the receiving terminal as shown in FIG. 5, a result as follows can be obtained. Compared to the weather parameters as shown in Table 3, an average statistical data of various cloud layers in atmosphere, that is, the relationship between various cloud layers and the attenuation constant τ is obtained. When the weather factor attenuation constant τ=3–6, that is, the weather condition can be a combination of cumulus (2000–5000 ft) and cumulonimbus (2500–18000 ft), and when the transmission bandwidth is about 2.5 Gbps, the standard deviation is 0.0001, the communication quality of the microwave reference signal CNR can still have 15 dB. The bit error rate can be less than $10^{-9}$. Thus, under the condition of these attenuation factors, the microwave reference signal can still be extract by the automatic frequency control circuit to control the demodulated signal.

In addition to the above advantages, after the demodulated signal is controlled, the quality of the demodulated signal of the receiver used in this embodiment is still good. From the above analysis, the invention does not only transmit signals in a bad weather, but also transmit a data larger than a data transmitted in a conventional microwave communication satellite. From the analysis in FIG. 6, the degree of influence on the system communication quality can be clearly monitored. The influence of the phase noise can be improved in the band-pass filters to improve the system transmission performance. The phase noise of the laser in FIG. 6 is 10 MHz. If the band-pass filter a is improved to 1, that is, if the bandwidth of the filter is reduced, the communication quality can also be improved.

The invention can receive a control signal of a dual frequency laser light emitter at a distant end. A heterodyne receiving can be performed between the far away emitter and the receiver. Even with the consideration of the satellite vibration and atmosphere attenuation, the communication quality can be maintained. The receiver do not need a VCO in a conventional automatic frequency control circuit. The receiver can be applied to a high speed satellite communication system. In addition, by simply put a mirror and a vibration control circuit on the satellite, the system can be used. The power consumption is little. The system is not affected by the sun spots. A multiple light beam superposition can be performed. Being reflected by a mirror, a multiple extraction can be applied.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A coherent optical communication receiver of a satellite optical communication system, comprising:

a telescope, receiving a light signal emitted from a satellite;

an automatic frequency control circuit, using a fiber connected to the telescope to receive the light signal received and transmitted by the telescope and convert the light signal into a mixing signal to be output; and a frequency shift keying demodulator, electrically connecting the automatic frequency control circuit to receive the mixing signal and to output a data, wherein the frequency shift keying demodulator further comprises:

a heterodyne receiver, electrically connected to the automatic frequency control circuit to receive the electrical signal output from the automatic frequency control circuit, and to output a plurality of demodulated signals;

an adder, to sum up the demodulated signals output by the heterodyne receiver to obtain a total demodulated signal;

a first low pass frequency filter, to receive the total demodulated signal and to output a low frequency signal; and a decision threshold, electrically connected to the low frequency signal to receive the low frequency signal and to output a data; wherein the light signal emitted by the satellite including a modulated signal laser frequency and a microwave reference frequency, the automatic frequency control circuit converting the modulated signal laser frequency and the microwave reference frequency into a mixing signal, the mixing signal including a microwave reference and a modulated signal, the automatic frequency control circuit using the microwave reference signal to control the demodulated signal, and the frequency shift keying demodulator correctly demodulate the demodulated signal to output the data.

2. The coherent optical communication receiver according to claim 1, wherein the automatic frequency control circuit further comprises:

a local oscillating laser, to generate a laser frequency;

a light polarization controller, to control the laser frequency generated by the local oscillating laser at an optimum polarization state;

a optical coupler, using the fiber to connect the telescope and the local oscillating laser, so as to receive the demodulated signal laser frequency transmitted from the telescope, the microwave reference frequency and the laser frequency generated by the local oscillating laser, to transmit the demodulated signal laser frequency, the microwave reference and the laser frequency;

a photo-detector, to receive the demodulated signal laser frequency, the microwave reference frequency and the laser frequency transmitted from the optical coupler and to generate a first frequency shift, a second frequency shift and the demodulate signal;

a microwave matching network, electrically connected to the photo-detector for microwave signal impedance matching;

a microwave mixer, electrically connected to the microwave matching network to receive the first and second frequency shifts and the demodulated signal generated by the photo-detector, to generate the mixing signal output to the frequency shift keying demodulator;

a frequency discriminator, electrically connected to the microwave mixer to receive the mixing signal and to discriminate the mixing to output a discriminated signal; and a second low pass frequency filter, electrically connected to the frequency discriminator and the local oscillating laser to receive the discriminated signal output by the frequency discriminator, and to filter the discriminated signal to generate a low frequency signal output to the local oscillating laser.

3. The coherent optical communication receiver according to claim 2, wherein the optical coupler comprises a 2×1 optical coupler.

4. The coherent optical communication receiver according to claim 2, wherein the microwave mixer comprises either one of a single end mixer or a balanced mixer.

5. The coherent optical communication receiver according to claim 1, wherein the heterodyne receiver further comprises:

a first band-pass filter, electrically connected to the automatic frequency control circuit to receive the mixing signal and to filter the mixing signal to generate and output a first intermediate frequency signal;

a first square law detector, electrically connected to the first band-pass filter to receive the first intermediate frequency signal, and to generate a first demodulated signal output to the adder;

a second band-pass filter, electrically connected to the automatic frequency control circuit to receive the mixing signal and to filter the mixing signal to generate and output a second intermediate frequency signal; and a second square law detector, electrically connect to the second band-pass filter to receive the second intermediate frequency signal, and to generate a second demodulated signal output to the adder.

6. A coherent optical communication receiver of a satellite optical communication system, comprising a telescope, an automatic frequency control circuit and a frequency shift keying demodulated, the telescope receiving a light signal emitting from a satellite, the automatic frequency control circuit using a fiber to connect to the telescope to receive the light signal from the telescope and to convert the light signal into a mixing signal, the frequency shift keying demodulator being electrically connected to the automatic frequency control circuit to receive the mixing signal and to output a data, wherein the light signal emitted by the satellite comprises a demodulated laser frequency and a microwave reference frequency, the automatic frequency control circuit converts the demodulated signal laser frequency and the microwave reference frequency into the mixing signal that comprises a microwave reference signal and a demodulated signal, the automatic frequency control circuit uses the microwave reference signal to track the laser frequency signal, and the frequency shift keying demodulator correctly demodulates the modulated signal to output a data, the automatic frequency control circuit comprises:

a local oscillating laser, to generate a laser frequency;

a light polarization controller, to control the laser frequency generated by the local oscillating laser at an optimum polarization state;

a optical coupler, using the fiber to connect the telescope and the local oscillating laser, so as to receive the demodulated signal laser frequency transmitted from the telescope, the microwave reference frequency and the laser frequency generated by the local oscillating laser, to transmit the demodulated signal laser frequency, the microwave reference and the laser frequency;

a photo-detector, to receive the demodulated signal laser frequency, the microwave reference frequency and the laser frequency transmitted from the optical coupler and to generate a first frequency shift, a second frequency shift and the demodulate signal;

a microwave matching network, electrically connected to the photo-detector for microwave signal impedance matching;

a microwave mixer, electrically connected to the microwave matching network to receive the first and second frequency shifts and the demodulated signal generated by the photo-detector, to generate the mixing signal output to the frequency shift keying demodulator;

a frequency discriminator, electrically connected to the microwave mixer to receive the mixing signal and to discriminate the mixing to output a discriminated signal; and a second low pass frequency filter, electrically connected to the frequency discriminator and the local oscillating laser to receive the discriminated signal output by the frequency discriminator, and to filter the discriminated signal to generate a low frequency signal output to the local oscillating laser.

7. The coherent optical communication receiver according to claim 6, wherein the optical coupler comprises a 2×1 optical coupler.

8. The coherent optical communication receiver according to claim 6, wherein the microwave mixer comprises either one of a single end mixer or a balanced mixer.

9. The coherent optical communication receiver according to claim 6, wherein the frequency shift keying demodulator further comprises:

a heterodyne receiver, electrically connected to the automatic frequency control circuit to receive the electrical signal output from the automatic frequency control circuit, and to output a plurality of demodulated signals;

an adder, to sum up the demodulated signals output by the heterodyne receiver to obtain a total demodulated signal;

a first low pass frequency filter, to receive the total demodulated signal and to output a low frequency signal; and a decision threshold, electrically connected to the low frequency signal to receive the low frequency signal and to output a data.

10. The coherent optical communication receiver according to claim 9, wherein the heterodyne receiver further comprises:

a first band-pass filter, electrically connected to the automatic frequency control circuit to receive the mixing signal and to filter the mixing signal to generate and output a first intermediate frequency signal;

a first square law detector, electrically connect to the first band-pass filter to receive the first intermediate frequency signal, and to generate a first demodulated signal output to the adder;

a second band-pass filter, electrically connected to the automatic frequency control circuit to receive the mixing signal and to filter the mixing signal to generate and output a second intermediate frequency signal; and a second square law detector, electrically connect to the second band-pass filter to receive the second intermediate frequency signal, and to generate a second demodulated signal output to the adder.

11. A coherent optical communication receiver of a satellite optical communication system, comprising:

a telescope, receiving a light signal emitted from a satellite;

an automatic frequency control circuit, using a fiber connected to the telescope to receive the light signal received and transmitted by the telescope and convert the light signal into a mixing signal to be output; and a frequency shift keying demodulator, electrically connecting the automatic frequency control circuit to receive the mixing signal and to output a data; wherein the light signal emitted by the satellite including a modulated signal laser frequency and a microwave reference frequency, the automatic frequency control circuit converting the modulated signal laser frequency and the microwave reference frequency into a mixing signal, the mixing signal including a microwave reference and a modulated signal, the automatic frequency control circuit using the microwave reference signal to control the a demodulated signal, and the frequency shift keying demodulator correctly demodulating the demodulated signal to output the data.

* * * * *